United States Patent Office 3,475,486
Patented Oct. 28, 1969

3,475,486
PROCESS FOR PREPARING PHOSPHONIC ACIDS
Riyad R. Irani and Robert S. Mitchell, St. Louis, Mo., assignors to Monsanto Company, St. Louis, Mo., a corporation of Delaware
No Drawing. Filed Sept. 12, 1966, Ser. No. 578,452
Int. Cl. C07f 9/38
U.S. Cl. 260—502.4          4 Claims

ABSTRACT OF THE DISCLOSURE

A process for preparing a 1-hydroxy, lower alkylidene-1,1-diphosphonic acid by reacting a carboxylic acid anhydride such as acetic anhydride with a di-organo phosphite such as dimethyl phosphite at a temperature below about 220° C. to form said diphosphonic acid and recovering said acid from the reaction product by steaming.

---

The present invention relates to processes for preparing phosphonic acids and, more particularly, to a process for preparing a 1-hydroxy, lower alkylidene-1,1-diphosphonic acid, especially 1-hydroxy, ethylidene-1,1-diphosphonic acid.

In general, there are two methods for preparing 1-hydroxy ethylidene-1,1-diphosphonic acid. One such method entails utilizing as reactants orthophosphorous acid and acetyl chloride or acetic anhydride. This method has numerous limitations among which include the relative unstability of the reactants at higher reaction temperatures as well as requiring highly concentrated orthophosphorous acid which is corrosive to many of the materials commonly used in processing equipment. Another such method entails utilizing as reactants phosphorus trichloride and acetic acid, however, this reaction requires at least three mols of acetic acid reactant per mol of phosphorus trichloride reactant be used, thus resulting in a substantial amount of by-products being formed. As can be appreciated, therefore, a process for preparing a 1-hydroxy, lower alkylidene-1,1-diphosphonic acid which, among other things, minimizes the limitations of the foregoing methods would represent an advancement in this art.

It is an object of this invention to provide a process for preparing a 1-hydroxy, lower alkylidene-1,1-diphosphonic acid, especially 1-hydroxy, ethylidene-1,1-diphosphonic acid.

It is a further object of this invention to provide a process for preparing a 1-hydroxy, lower alkylidene-1,1-diphosphonic acid utilizing relatively non-corrosive reactants and relatively stable reactants at high temperatures; which process results in little, if any, by-products being formed.

These and other objects will become apparent from a reading of the following detailed description.

It has now been found that a 1-hydroxy, lower alkylidene-1,1-diphosphonic acid can be prepared advantageously by reacting a di-organo phosphite and an organic carboxylic acid derivative at a temperature below about 220° C. whereby a normally solid anhydrous reaction product is formed and thereafter recovering the desired 1-hydroxy, lower alkylidene-1,1-diphosphonic acid therefrom as will be more fully discussed hereinafter.

The following is the overall reaction, utilizing a carboxylic acid anhydride as a reactant, in equation form:

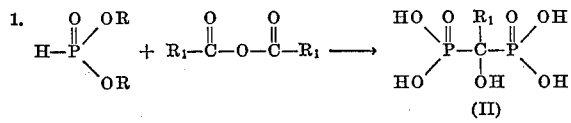
(II)

wherein each R is selected from the groups consisting of lower alkyl (1–6 carbon atoms), phenyl, tolyl, and xylyl and $R_1$ is a lower alkyl (1–4 carbon atoms). It is preferred that both R and $R_1$ be either methyl or ethyl groups.

The compounds that can be prepared by the processes of the present invention, i.e., compounds II above, are herein generically termed "1-hydroxy, lower alkylidene-1,1-diphosphonic acids." The compounds can also be termed alkane, 1-hydroxy-1,1-diphosphonic acids. Such compounds have been found to be useful as sequestering agents for heavy metal cations in aqueous systems.

Typical di-organo phosphites which are suitable for use in the process include dimethyl phosphite, diethyl phosphite, dipropyl phosphite, dibutyl phosphite, ethyl propyl phosphite, methyl ethyl phosphite, dihexyl phosphite, methyl pentyl phosphite, methyl phenyl phosphite, diphenyl phosphite, ditolyl phosphite, dixylyl phosphite, ethyl tolyl phosphite and the like.

Suitable organic carboxylic acid derivatives include organic carboxylic anhydrides and/or organic carboxylic acid halides. Such organic carboxylic acid derivatives can be characterized by having the following formula:

(III)

wherein X is a member selected from the group consisting of halogens (preferably chloride and bromide) and oxygen, n is 0 when X is a halogen and 1 when X is oxygen and $R_1$ is a lower alkyl group containing from 1 to about 4 carbon atoms.

Suitable organic carboxylic anhydrides include acetic anhydride, propionic anhydride, trimethyl acetic anhydride, butyric anhydride, isobutyric anhydride, isovaleric anhydride, valeric anhydride and the like.

Suitable organic carboxylic acid halides include acetyl chloride, propionyl chloride, isobutyryl chloride, n-butyryl chloride, diethyl acetyl chloride, iso-valeryl chloride, acetyl bromide, propionyl bromide, n-butyryl bromide, iso-valeryl bromide and the like.

In general, it is preferred to use the organic carboxylic anhydride in the process of the present invention since such can be used, if desired, without an inert non-aqueous reaction medium. When using an organic carboxylic acid chloride in the process of the present invention, it should preferably be used in an inert non-aqueous reaction medium, especially an organic carboxylic acid, although such mediums containing non-polar solvents can be used which include paraffin hydrocarbons, benzene, toluene, xylene, acetone and the like.

The reaction to prepare the normally solid anhydrous product is temperature dependent to the extent that above about 220° C. the yield is extremely low and essentially only degraded or condensed products are formed which do not yield the desired 1-hydroxy, lower alkylidene-1,1-diphosphonic acid (under atmospheric pressure, although sub-atmospheric pressures as well as pressures in excess of atmospheric can be used). Also the reaction becomes slow while operating at temperatures below about 70° C. and therefore it is preferred that the operating temperature range be from about 70° C. to about 220° C. with temperatures of from about 90° C. to about 160° C. being especially preferred. However, temperatures may be used below about 70° C. if longer reaction times can be tolerated.

The reactants can be used in varying amounts depending upon such factors as particular reactants, temperature conditions and the like. Generally speaking, it is usually necessary to use at least about 1 mole of carboxylic acid derivative reactant per mole of di-organo phosphite reactant. It is preferred to use excess amounts of the organic carboxylic acid derivative, that is, amounts above about 1 mole of carboxylic acid derivative per mole of di-organo phosphite, and excess amounts of the starting carboxylic acid derivatives of from about 10% to about 500% are preferred, although amounts in excess of 500% can be used but such amounts do not, in most cases, appear advantageous.

A normally solid (e.g., solid mass at room temperature of about 25° C.) anhydrous reaction product (intermediate product) is formed by the foregoing reaction which usually contains, in addition to some of the desired product (1 - hydroxy, lower alkylidene-1,1 - diphosphonic acids) or derivatives thereof, a complex mixture of products believed to be condensed or dehydrated species, such as polymers, of the desired product and in some cases excess or unreacted carboxylic acid derivatives.

The desired 1-hydroxy, lower alkylidene - 1,1 - diphosphonic acids can be recovered from the normally solid anhydrous reaction product by many and various known methods which include an alcohol treatment as disclosed and described in Canadian Patent 728,189, dated Feb. 15, 1966, and a water and/or stream treatment as disclosed and described in Canadian Patent 701,850 dated Jan. 12, 1965, which are incorporated herein by reference. It is preferred, however, to recover the desired 1-hydroxy, lower alkylidene-1,1-diphosphonic acids from the normally solid anhydrous reaction product by steaming. The anhydrous reaction product can be treated with steam while being maintained at elevated temperatures, i.e., above about 100° C., and preferably from about 115° C. to about 150° C., and under atmospheric pressure (although sub-atmospheric pressures as well as pressures in excess of atmospheric can be used) thereby volatilizing off carboxylic acids, if present, as well as hydrating any of the condensed or dehydrated species of the desired product which may be present. This steaming step yields an aqueous, usually highly concentrated (preferably greater than about 50% by weight), solution or slurry of the desired product. The steam treatment can be carried out by steaming, that is, by passing or introducing steam (at a temperature at from about 100° C. to about 200° C., preferably in the range of from about 110° C. to about 150° C.) into the anhydrous product in such a manner as to establish intimate contact of the anhydrous product with the steam such as by steam sparging and the like.

Depending upon, inter alia, the reactants used and reaction conditions, in some cases (preferably the batch method, infra), it may be necessary to add water to the normally solid anhydrous reaction product prior to recovering the desired product from the normally solid anhydrous reaction product. The amount of water which can be added can vary but is usually in an amount which will cause the exothermic reaction of the anhydrous product (due to the addition of the water) to substantially subside or cease. Such an amount is usually from about 1% to about 40% by weight of the anhydrous product and preferably from about 10% to about 20%.

The 1-hydroxy, lower alkylidene - 1,1 - diphosphonic acids normally solid materials, may be recovered from the aqueous medium, if desired, as crystals, by various methods such as, removing the water by evaporation including vacuum evaporation, allowing the compounds to crystallize by cooling a relatively hot saturated aqueous solution, allowing the compounds to crystallize from a saturated solution by seeding the solution, precipitating by the addition of a miscible solvent in which the compounds are less soluble, such as methanol, ethanol, acetone and the like. Usually the amorphous forms of the compounds can be formed when the water of solution is quickly removed under high temperature conditions such as by flash drying, drum drying and the like.

The process can be carried out by many and various methods. For example, in a batch process, the carboxylic acid derivative reactant can be charged to a suitable reaction vessel equipped with a stirrer and the di-organo phosphite added either continuously or intermittently to the carboxylic acid derivatives under agitation and the reactants can be heated to prepare the normally solid reaction product and thereafter the product can be steam treated in order to recover the desired 1-hydroxy, organo-1,1-diphosphonic acid.

Another method which can be used is a continuous method whereby the reactants are continuously fed into suitable reaction vessels with the rate of feed of the reactants as well as other reaction conditions, such as temperature, used to insure the continuous withdrawal of the desired product. This can be accomplished by, for example, a series of two reaction vessels in which the normally solid reaction product is prepared in a first vessel, then passed to a second vessel in which the steaming step can be performed. The sojourn times in each vessel can be coordinated such that each are about equal, that is, for example, a sojourn time in each vessel of from about 30 to 240 minutes, thus resulting in a relatively continuous passing of reactants into the reaction and exiting of the desired product.

The following examples are presented to illustrate the invention, with parts by weight being used in the examples unless otherwise specified.

EXAMPLE I

A charge of about 102 parts of acetic anhydride and about 107 parts of dimethylphosphite are placed in a suitable reaction vessel equipped with a reflux condenser. The reaction mixture is heated to about 145° C. (reflux temperature) and maintained under reflux temperature for about 4 hours at which time the reflux temperature is about 95° C., to form a normally solid anhydrous reaction product. Steam sparging is then started and continued while the batch is heated to about 135°–140° C. for about 60 minutes. The desired product, 1-hydroxy, ethylidene-1, 1-diphosphonic acid, containing about 15% by weight of water, yields about 85% based on phosphorus and about 15% phosphorous acid.

EXAMPLE II

In the same manner as in Example I, above, about 112 parts of acetic anhydride and about 138 parts of diethylphosphite are reacted and then processed to prepare the desired product, 1-hydroxy, ethylidene-1, 1-diphosphonic acid, in a yield of about 85% based on phosphorus.

EXAMPLE III

In the same manner as in Example I, above, about 112 parts of acetic anhydride and about 144 parts of dibutyl phosphite are reacted and then processed to prepare the desired product, 1-hydroxy, ethylidene-1, 1-diphosphonic acid, in a yield of about 60% based on phosphorus.

EXAMPLE IV

In the same manner as in Example I, above, about 234 parts of diphenylphosphite and about 112 parts of acetic anhydride are heated to about 130° C. for about 4 hours to form a normally solid anhydrous reaction product which is processed to yield the desired product, 1-hydroxy, ethylidene-1, 1-diphosphonic acid.

EXAMPLE V

In the same manner as in Example I, above, about 262 parts of ditolyl phosphite and about 150 parts of propionic anhydride are heated to about 160° C. for about 3 hours to form a normally solid anhydrous reaction product which is then processed to yield the desired product, 1-hydroxy, propylidene-1, 1-diphosphonic acid.

EXAMPLE VI

In the same manner as in Example I, above, about 290 parts of dixylyl phosphite and about 112 parts of acetic anhydride are heated to a temperature of about 110° C.

for about 5 hours to form a normally solid anhydrous reaction product which is then processed to yield the desired product 1-hydroxy, ethylidene-1, 1-diphosphonic acid.

EXAMPLE VII

In the same manner as in Example I, above, about 43 parts of acetyl chloride and about 107 parts of dimethylphosphite are placed in glacial acetic acid medium (about 100 ml.), reacted at about 100° C. for about 4 hours and processed to prepare the desired product, 1-hydroxy, ethylidene-1,1-diphosphonic acid.

What is claimed is:

1. A process for preparing a 1-hydroxy, lower alkylidene-1,1-diphosphonic acid which comprises reacting a di-organo phosphite having the formula:

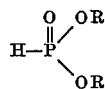

wherein each R is selected from the group consisting of lower alkyl, phenyl, tolyl and xylyl, with at least one mole of an organic carboxylic acid anhydride of the formula

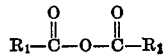

$R_1$ is lower alkyl, at a temperature from about 70° C. to about 220° C. whereby a normally solid anhydrous reaction product is formed and, thereafter, recovering said 1-hydroxy, lower alkylidene-1,1-diphosphonic acid from said reaction product by steaming.

2. A process for preparing 1-hydroxy, ethylidene-1,1-diphosphonic acid according to claim 1, wherein said di-organo phosphite is dimethyl phosphite and said organic carboxylic acid anhydride is acetic anhydride.

3. A process for preparing 1-hydroxy, ethylidene-1,1-diphosphonic acid according to claim 1, wherein said di-organo phosphite is diethyl phosphite and said organic carboxylic acid anhydride is acetic anhydride.

4. A process for preparing 1-hydroxy, propylidene-1,1-diphosphonic acid according to claim 1, wherein said organic carboxylic acid anhydride is propionic anhydride.

References Cited

UNITED STATES PATENTS

| 2,848,475 | 8/1958 | Schmidt | 260—502.4 |
| 3,299,123 | 1/1967 | Fitch et al. | 260—502.4 |
| 3,366,677 | 1/1968 | Quimby | 260—502.4 |

FOREIGN PATENTS

| 978,297 | 12/1964 | Great Britain. |
| 728,189 | 2/1966 | Canada. |

LEON ZITVER, Primary Examiner.

J. E. EVANS, Assistant Examiner